United States Patent
Lee

[11] Patent Number: 5,969,360
[45] Date of Patent: Oct. 19, 1999

[54] READOUT SEQUENCE FOR RESIDUAL IMAGE ELIMINATION IN A RADIATION DETECTION PANEL

[75] Inventor: Denny L. Y. Lee, West Chester, Pa.

[73] Assignee: Direct Radiography Corp., Newark, Del.

[21] Appl. No.: 08/979,134

[22] Filed: Nov. 26, 1997

[51] Int. Cl.⁶ .................................................. H04N 5/32
[52] U.S. Cl. ................ 250/370.09; 250/580; 378/98.11; 378/98.12; 378/28
[58] Field of Search ............................... 250/370.09, 580; 378/98.11, 98.12, 28

[56] References Cited

U.S. PATENT DOCUMENTS

| | | |
|---|---|---|
| 4,482,918 | 11/1984 | Keyes et al. ......................... 378/98.11 |
| 4,752,944 | 6/1988 | Conrads et al. . |
| 4,975,935 | 12/1990 | Hillen et al. . |
| 4,998,266 | 3/1991 | Hillen et al. ............................... 378/28 |
| 5,272,536 | 12/1993 | Sudo et al. . |
| 5,319,206 | 6/1994 | Lee et al. . |
| 5,498,880 | 3/1996 | Lee et al. . |
| 5,530,238 | 6/1996 | Meulenbrugge et al. . |
| 5,563,421 | 10/1996 | Lee et al. . |
| 5,818,898 | 10/1998 | Tsukamoto et al. . |

*Primary Examiner*—Constantine Hannaher
*Assistant Examiner*—Andrew Israel
*Attorney, Agent, or Firm*—Ratner & Prestia

[57] ABSTRACT

A method for the elimination of residual image artifacts from prior image exposure in an x-ray image obtained by exposing an x-ray image detector which includes a photoconductor to imaging x-ray radiation, wherein the residual image artifacts are eliminated by a process which includes obtaining and averaging pre and post exposure image data from the detector and subtracting the averaged pre and post exposure data from the image exposure data.

6 Claims, 6 Drawing Sheets

READOUT SEQUENCE FOR RESIDUAL IMAGE ELIMINATION IN A RADIATION DETECTION PANEL

BACKGROUND OF THE INVENTION

1. Field of the Invention

This invention relates to a method for removing prior exposure artifacts in a radiation detection panel and more particularly to a method for operating and reading out information from an X-ray detection panel by continuously cycling the panel and using pre and post exposure information to minimize residual images.

2. Description of Related Art

Direct radiographic imaging using panels comprising a two-dimensional array of minute sensors to capture a radiation generated image is well known in the art. The radiation is imagewise modulated as it passes through an object having varying radiation absorption areas. Information representing an image is captured as a charge distribution stored in a plurality of charge storage capacitors in individual sensors arrayed in a two dimensional matrix.

The panels comprise a two-dimensional array of sensors with associated switching and addressing circuitry built on an insulating substrate, usually a glass plate. Such sensors typically include a pair of generally coplanar conductive microplates separated by a dielectric layer forming a charge storage capacitor. Extending over all the sensors above the microplates is a photoconductive layer which is sensitive to X-ray radiation. A top electrode is placed over the photoconductive layer.

The two microplates in each sensor serve to collect and store charges representing the radiation exposure of the sensor. U.S. Pat. No. 5,319,206 issued to Lee et al. on Jun. 7, 1997, originally assigned to E. I. Dupont de Nemours and Co. Inc. and now reassigned to the assignee of this invention, shows a typical radiation detection panel comprising an array of sensors for the generation and capture of charges following exposure to X-ray radiation.

When using a panel as described in the Lee et al. patent, a charging voltage is applied to the bottom microplates of all sensors and the top electrode. This creates an electric field in the photoconductive layer. Upon exposure to radiation, electron/hole pairs are generated in the photoconductive layer by the absorbed radiation exposure energy.

Under the influence of the applied electric field, the electrons and holes produced separate and migrate toward the top electrode and toward the microplates. In detector structures where a positive charging voltage is applied to the top electrode, electrons move toward the top electrode, and holes migrate toward the top microplates. The hole migration results in a charge accumulation during exposure in the charge storage capacitors formed by the two microplates and the dielectric separating them. Subsequent removal of the charging voltage and the exposing radiation leaves the accumulate charges trapped in the capacitors.

The amount of charge stored in the storage capacitors varies in direct proportion to the radiation exposure. Exposure is normally defined as the product of the radiation intensity "I" times the duration "t" during which radiation impinges on the detector. ( $E=I \times t$ ). The charge Q produced under exposure is given by $Q=e \times (E/\epsilon)$, where E is the energy absorbed due to the exposure, $\epsilon$ is the energy required to generate an electron/hole pair and $e$ is the electric charge of an electron.

Readout of the stored charges is accomplished in any one of a plurality of manners. U.S. Pat. No. 5,648,660 by Lee et al. originally assigned to E. I. Dupont de Nemours and currently also re-assigned to the assignee of the present application, discloses a method for the readout of stored charges in a direct radiographic imaging panel.

In reading out information from panels which include a photoconductive layer, one encounters a problem commonly referred to as memory. This memory is the result of a slow, exponential type return of the photoconductor to its original "dark" state following exposure to radiation. Therefore, following each exposure, the photoconductor contains areas having prior image information. When a subsequent exposure of a second image is made, residual image information in the panel produces what is referred to in the trade as phantom or ghost artifacts. Obviously, such artifacts are undesirable as they degrade the image quality of the radiogram and the value of the image for diagnostic purposes.

Attempts to solve this problem include measuring the decay properties of the photoconductor, recording the elapsed time between exposures, and attempting to correct the output of each pixel by subtracting from each output a calculated charge value based on the time elapsed between the prior exposure and the current exposure. Variations of this method are disclosed in U.S. Pat. No. 4,975,935 issued Dec. 4, 1990 to Hillen et al., and U.S. Pat. No. 5,530,238 issued to Meulenbruge et al. Jun. 25, 1996, both assigned to U.S. Philips Corporation. However, this method suffers in that it is based on a calculated value, which is only approximate and which does not accurately reflect the full prior history of the photoconductor area above each sensor, such as the residual effect of multiple exposures at different time intervals.

It is an object of the present invention to provide a method by which the phantom type artifacts discussed above are greatly eliminated and which is not dependent on theoretical computations of the photoconductor decay characteristics.

SUMMARY OF THE INVENTION

The above object is obtained in accordance with this invention through a process for removing residual prior image information representing prior exposure artifacts, from new image information generated by radiation exposure of an image detection array which contains a plurality of radiation sensitive picture elements (pixels) which convert incident radiation into electrical charges. Electrical charges, generated as a result of the radiation exposure, are stored in individual charge capacitors in each of the of pixels and are read out with read-out electronics and are stored in a memory for further use in displaying the image.

Briefly, this is a process for correcting an electronic signal representing an image comprising a plurality of pixels, said image resulting from the exposure of a detector to imaging radiation. The process comprises operating the detector without exposing to imaging radiation and obtaining a pre-exposure electronic signal for said plurality of pixels, operating the detector a second time and exposing to imaging radiation, and obtaining an exposure electronic signal for the plurality of pixels. Then finally, the process comprises subtracting the pre-exposure electronic signal from the exposure signal pixel by pixel, to produce a corrected exposure electronic signal.

Preferably, the above process includes the additional step of operating the detector a third time, following exposure to imaging radiation, again without exposing to imaging radiation, to obtain a post-exposure data. Next, the pre-exposure and post-exposure signals are averaged, pixel by pixel, to obtain an average data which is subtracted from the exposure signal, pixel by pixel, to produce a corrected exposure data.

In more detail, the process according to this invention comprises the following steps:

A) continuously operating the array;
B) obtaining and storing in memory pre-exposure data representing a residual pixel by pixel charge distribution read out from the array prior to an image exposure;
C) obtaining and storing in memory exposure data representing an image pixel by pixel charge distribution read out from the array following an imaging exposure; and
   subtracting from the exposure data, pixel by pixel, the pre-exposure data to obtain corrected data representing new image data without prior exposure artifacts.

In a more sophisticated version of this invention, the process further includes the additional steps performed prior to the subtracting step:

D) obtaining and storing in memory post-exposure data representing a post-exposure pixel by pixel charge distribution read from the array immediately following the new image exposure without further image exposure of the panel; and
E) averaging for each pixel the pre- and post-exposure data corresponding to such pixel to obtain a correction signal for each pixel.

The data is preferably a digital signal representing the charge stored in each pixel.

BRIEF DESCRIPTION OF THE DRAWINGS

The invention can be more fully understood from the following description thereof in connection with the accompanying drawings described as follows.

DESCRIPTION OF THE PREFERRED EMBODIMENT(S)

Figure 1:
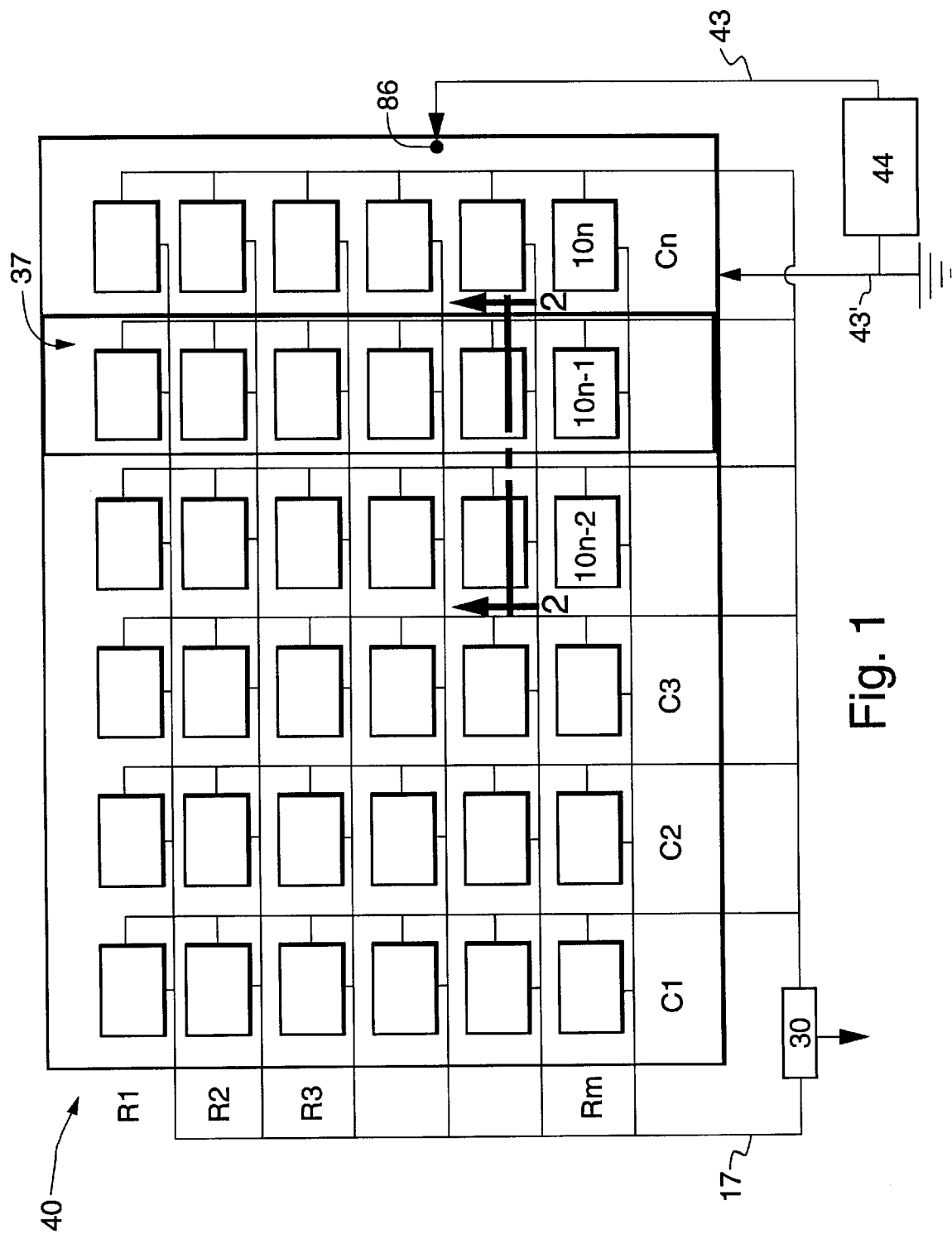
FIG. 1 shows a typical radiation detection panel array in accordance with this invention.

Throughout the following detailed description, similar reference characters refer to similar elements in all figures of the drawings.

Referring now to FIG. 1, there is shown in schematic representation a preferred radiation detection panel 40 comprising a plurality of radiation detecting elements 10a, 10b, 10c. . . 10n, arranged in a plurality of rows R1, R2, R3, R4, . . . Rm and in a plurality of columns C1, C2, C3, . . . Cn,. This panel and the method of reading out the stored charges in the storage capacitors in a manner which produces a signal with reduced noise levels is described in complete detail in U.S. patent application Ser. No. 08/583,256 by Lee et al.

Figure 2:
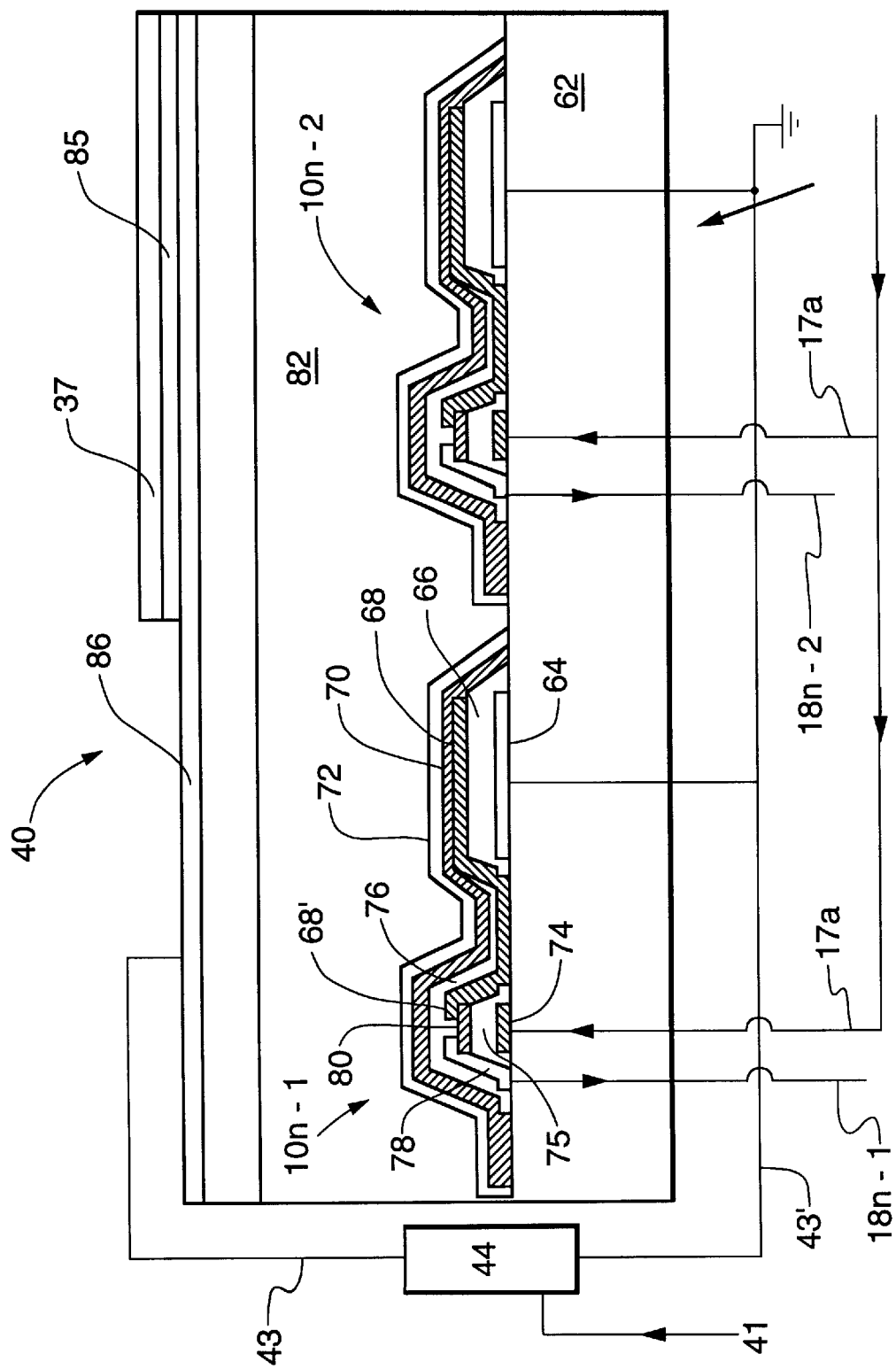
FIG. 2 shows a cross section of the panel of FIG. 1 along line 2—2.

FIG. 2 shows, in schematic illustration, an elevation cross section taken through the panel shown in FIG. 1 along arrows 2—2. FIG. 2 shows a cross section of panel 40 encompassing two detection elements 10n-1 and 10n-2, having identical structure. Only one will therefore be described. The elements are built on a non-conductive support 62, which is preferably a glass support. In constructing each element of the panel on a surface of this glass support, which surface now becomes the inner surface, there is deposited a first conductive electrode 64. The electrode 64 is next covered with a dielectric layer 66. A second conductive electrode called a microplate 68 is placed over the dielectric 66. The microplate 68 together with the dielectric 66 and the conductive electrode 64 form a capacitor which acts as the charge accumulator. Electrode 64 is connected to a common ground. An FET transistor is also constructed next to the charge accumulator for each detection element by depositing a gate electrode 74 on the glass support. A dielectric material 75 which is not shown in scale in this figure, is placed over the gate 74. A semiconductor 80, i.e. Amorphous Silicon, Cadmium Selenide, etc. is placed over the dielectric 75. A source electrode 78 and a drain electrode 68' are next connected to the semiconductor 80 to complete the transistor. Drain 68' is connected to microplate 68. A dielectric 76 insulates the transistor. The source 78 is accessible from outside the panel over lines 18. Gate 74 is addressed over gate address line 17a. As shown in this figure, all the gate lines in the same row are interconnected.

Optionally, but preferably, a second conductive electrode is placed over the dielectric layer 76, and in contact with microplate 68, to form mushroom electrode 70. The presence of this electrode has no effect to the operation of this invention, however detection elements incorporating "mushroom" electrodes (as described in U.S. Pat. No. 5,498,880 issued to Lee et al.) perform better, and are preferred as detectors. A charge blocking layer 72 is preferably an aluminum oxide layer placed over electrode 70.

A photoconductive layer 82, typically selenium, is next applied over the full panel and covers all elements thereon. The photoconductive layer 82 is covered by a continuous dielectric layer 84 which is in turn covered by a continuous top conductive electrode layer 86. Programmable power supply 44 is connected to this layer 86 through line 43. Power supply 44 is also connected through line 43' to a common ground to which electrodes 64 are also connected.

Dielectric layer 84 and conductive layer 86 are transparent to the radiation intended to be detected by the present panel. As is seen in FIG. 2 (and also in FIG. 1) in the preferred embodiment, and for the reasons explained in the aforementioned Lee application Ser. No. 08/583,256, a portion of the panel is shielded from incident radiation with a shield 37.

Figure 3:
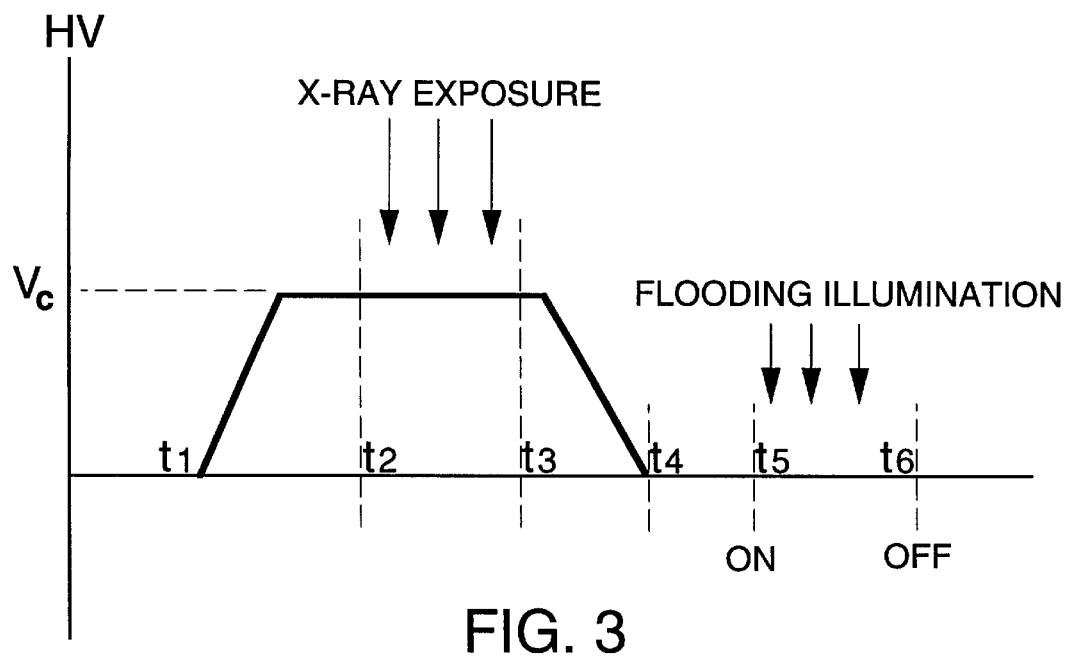
FIG. 3 shows a timing diagram illustrating the sequence of operation performed by the array of FIG. 1 for capturing an image.

The operation of the panel to capture an image will next be explained with reference to FIG. 3 which shows a timing diagram of the various operations needed.

Power supply 44 supplies a charging voltage Vc to the top electrode 86 at a time $t_1$. This is a high DC voltage and it is applied gradually. After the charging voltage is applied, the panel is exposed to imaging X-ray radiation, for a period of time $t_2$ to $t_3$. This time period is similar to the time period used for the X-ray imaging radiation exposure. The charging voltage is again returned to ground.

Readout of the charges in the individual storage capacitors begins at a time $t_4$. The aforementioned application by Lee et al. describes in detail the preferred mode to obtain an electronic signal from the array representing the charges and the data they represent. The disclosed method results in obtaining data substantially free from switching noise in the integrating amplifiers and from common mode noise in the lines in a panel comprising a plurality of such detection elements.

At a time $t_5$, after all the capacitors have been addressed and the readout of the charges is completed, the panel is flooded with uniform intensity illuminating radiation as disclosed in the aforementioned U.S. Pat. No. 5,563,421. The illumination may be visible, infrared or any convenient radiation to which the photoconductive layer is sensitive. The illumination of the panel is terminated at a time $t_6$ and the panel is again ready to be charged for the next cycle.

Under the influence of the radiation exposure, holes and electrons are liberated in the photoconductive layer, and these charges begin to migrate toward the top electrode and the top microplate respectively under the influence of the applied DC charging voltage. When the exposure is terminated, there are still some holes and electrons which have not reached either electrode but are somewhere in the bulk of the photoconductive layer. If these charges are not neutralized prior to the next exposure, they create ghost artifacts in the next image.

These charges generated during imaging exposure migrate toward the respective electrodes in the photoconductive layer. The distance they travel before becoming trapped, known as Range "R", is a function of the charge mobility constant of the photoconductive material, the probability time constant for a free charge to become trapped in the material, which is related to the purity of the photoconductive material, and the applied field. The photoconductive material and layer thickness are preferably chosen such that the range "R" is greater than the thickness of the layer.

In a typical example of a photoconductive layer comprising selenium, the value of R for the holes may be of the order of 600 micrometers. In such case, a photoconductive layer thickness of about 500 micrometers will minimize residual charge artifacts.

Not all charges, however, migrate successfully. While the above numerical examples regarding range are useful in selecting the photoconductive material and deciding on a preferred layer thickness, charge migration and range are subject to a probability that for a given period of time a percentage of the charges will be trapped within the bulk of the photoconductive layer, and that not all charges will transit the full range. These trapped charges will then be added to the charges generated in the next exposure and produce artifacts.

When a dielectric layer such as layer 84 is placed between the photoconductive layer and the top electrode, and a positive voltage is applied to the top electrode, electrons produced following exposure and migrating toward the positive electrode find their path blocked by the dielectric layer and get trapped at the interface between the dielectric and the photoconductive layers. Their presence there tends to set up a secondary field which opposes the primary field set up by the charging voltage applied to the top electrode. Because these electrons are not evenly distributed along the dielectric/photoconductor interface, they produce a non-uniform field which becomes the source of additional artifacts in the following exposure.

The illumination of the panel tends to neutralize residual charges in the photoconductive layer through the generation of a large number of electron/hole pairs in the photoconductive layer. The effect of the illumination of the panel and details as to different illuminating sources are given in detail in the aforementioned U.S. Pat. No. 5,563,421 issued Oct. 8, 1996, to Lee et al., the contents of which are incorporated herein by reference.

While this process step theoretically should eliminate any artifacts from prior exposures by "reconditioning" in effect the photoconductive layer, this does not happen quite as effectively as desired.

To further eliminate the ghost artifact due to previous exposures, the panel, between imaging exposures to radiation, is operated by constantly subjecting it, according to this invention, to continuous "charge/read out/discharge" cycles in a "standby" mode.

Figure 4:
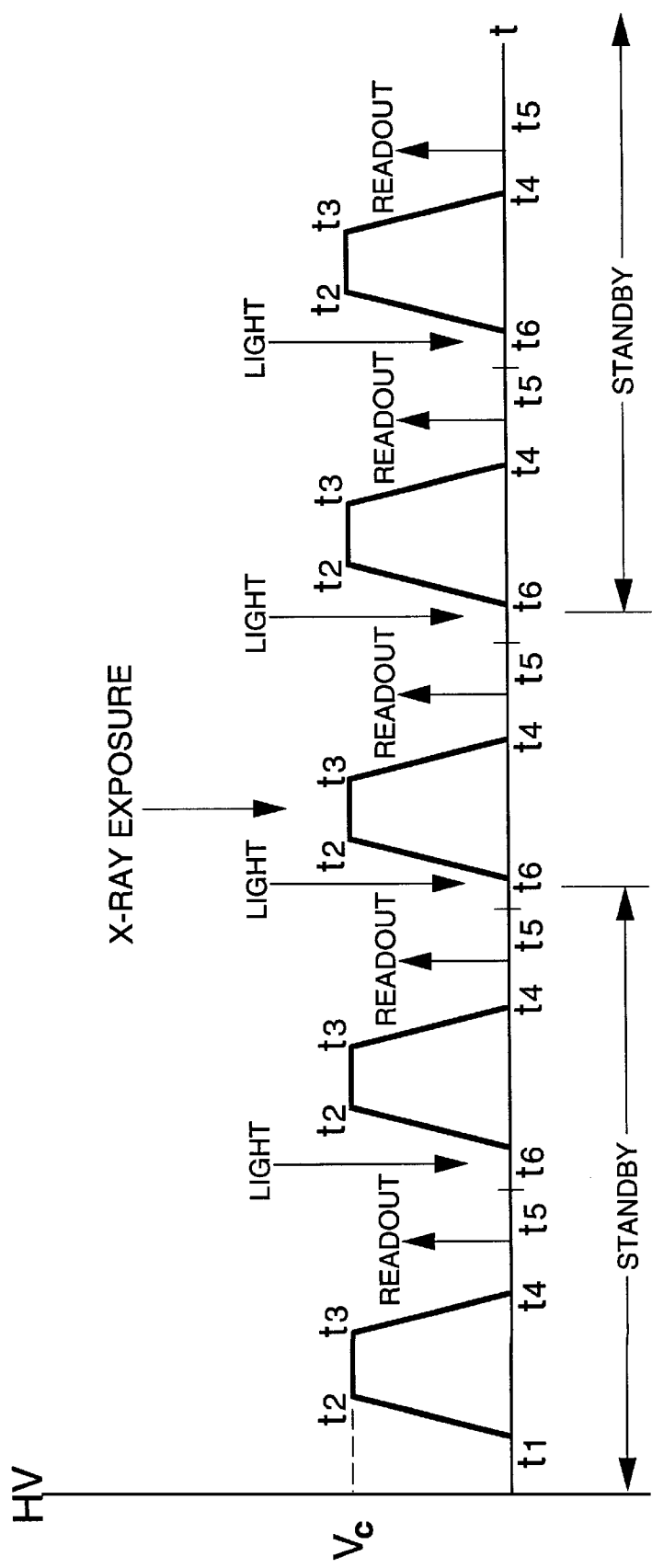
FIG. 4 shows a timing diagram illustrating the manner of operating an array, such as shown in FIG. 1, in accordance with this invention.

As shown in FIG. 4, the panel is constantly undergoing cycling as follows: At a time $t_1$ the high DC voltage (VC) is gradually applied to the top electrode. Once the full voltage is applied, at a time $t_2$, it is maintained at this level until a time $t_3$. The DC voltage is next gradually returned to ground (or zero) at a time $t_4$ and the storage capacitors for all detector elements (pixels) are read out. The data from the capacitors is stored in a memory. At a time $t_5$, following readout, the panel is, preferably, flooded with uniform illuminating radiation, such as visible radiation, again preferably from both sides, until a time $t_6$. This step may be identical to the illumination step described in the aforementioned U.S. Pat. No. 5,563,421. At time $t_6$, the illuminating step is terminated, and the high DC voltage is reapplied to the top electrode. This cycle is repeated continuously and the readout data from each readout is stored in the memory, replacing the previously acquired stored data. During this mode of operation the panel is said to be in the standby mode.

When an imaging exposure is to occur, the panel is again subjected to the gradual application of a DC voltage to the top electrode. While the DC voltage remains applied to the top electrode, imaging radiation exposure occurs. Following radiation exposure, the charges stored in the capacitors are again readout, and the exposure pixel data is stored in a different memory location or another memory, without replacing the data of the immediately preceding panel readout.

Following radiation exposure, the panel returns to the standby mode and continues to be cycled through the illumination, high DC voltage application, capacitor readout and so on steps as before exposure. The data from the exposure last preceding the imaging exposure is preserved for use in correcting the exposure data.

In a preferred mode of operation, before returning to the standby mode following acquisition of the exposure data, the data from the immediate following cycle of illumination, charging, and readout is also stored without replacing the previously stored pixel data from either the pre-exposure readout or the actual exposure readout. Storage may be in separate, individual first, second and third memories, or in a large capacity single memory. Typically such memories are electronic memories of the type widely used in personal computers.

The pixel data obtained from the panel readout as a result of the radiation exposure is corrected to remove artifacts due to prior exposures by combining the stored data to eliminate artifact noise.

In the preferred mode, this is done by subtracting from the stored image exposure data for each pixel a calculated value equal to the average of the stored pre-exposure and post-exposure values for this pixel. Thus, if a pixel has a value P1 stored in memory representing the last pre-exposure value obtained, and the same pixel has a stored value P3 representing the first post exposure value obtained following imaging exposure, then the preferred corrected value for this pixel is:

$$Pc = P2 - \{(P1+P3)/2\},$$

where P2 is the obtained exposure pixel value for the same pixel.

It is these corrected pixel values Pc which are stored and used in the final image display of the captured radiogram.

Following the correction of the pixel values, all memories are cleared and the cycling of the panel continues, again storing the readout of each cycle in the first memory until the next image exposure.

However, it is not essential that both the pre-exposure and post-exposure data be used in the correction formula. In cases where there are reasons to limit the amount of available memory, the third memory may be eliminated and the corrected pixel arrived at by subtracting the pre-exposure value from the exposure value. Similarly, more than one pre-exposure and post exposure frame may be stored and used in deriving an average correction value to be subtracted-from the exposure value. Nor is it absolutely essential that a simple average of the pre and post exposure pixel values be used. The pixels may be given different weights in the averaging process depending on the type of photoconductor used.

Figure 5:
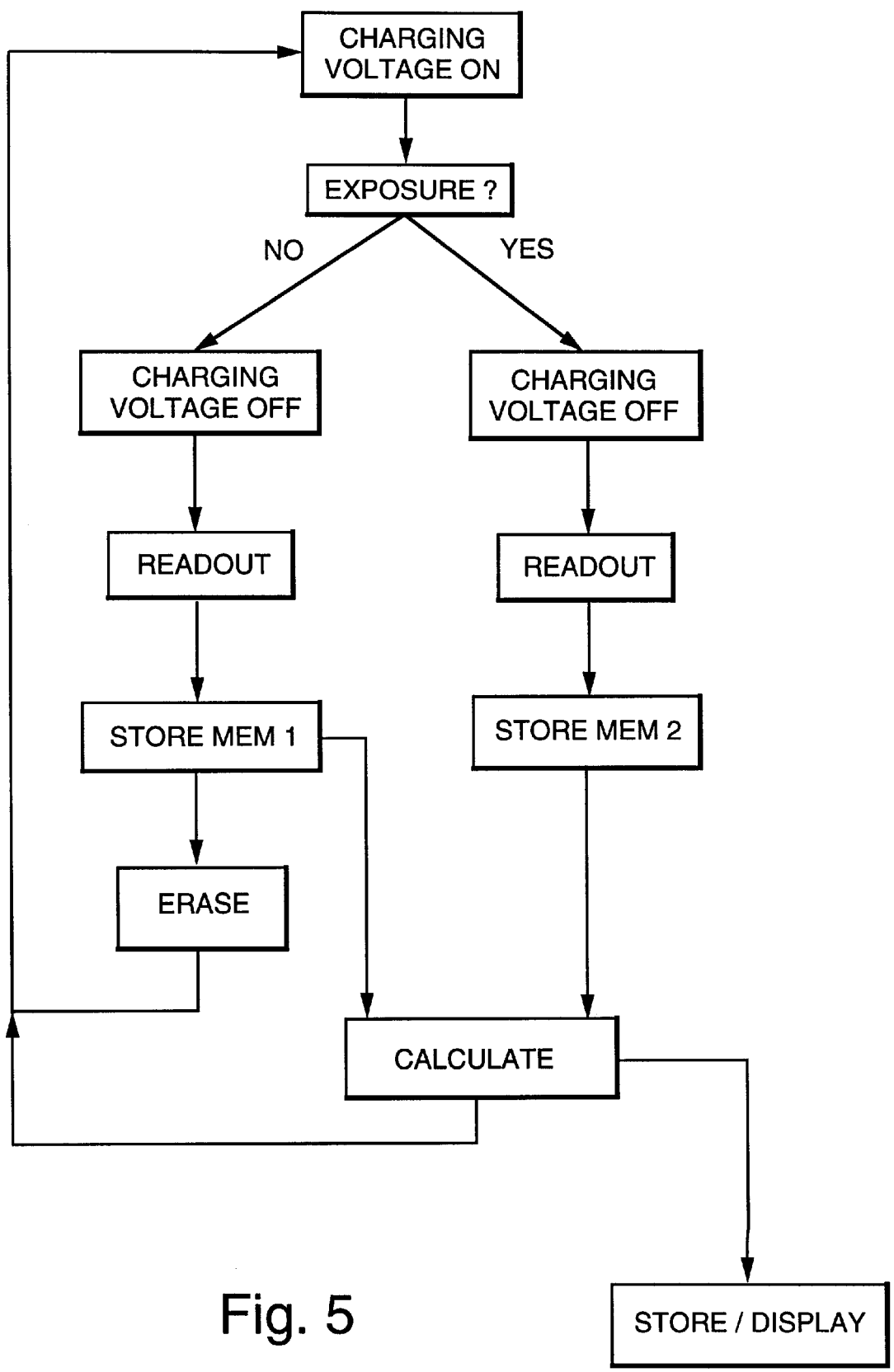
FIG. 5 shows a flow diagram of the data processing sequence for the data obtained through the use of the process of the present invention.

FIG. 5 shows as a flow diagram the sequence of operations when the panel is cycled continuously. Following the high DC voltage application, a determination is made whether there will be an imaging exposure in this cycle. If not, the high voltage is removed, and the panel is readout. The obtained data is stored in the first electronic memory, which may be a part of a larger memory. The panel is next erased using flooding illumination and the process is repeated.

If an exposure occurred in the cycle following the removal of the high voltage, the readout data is stored in a second electronic memory (or second portion of the larger memory) and the data from the first memory is subtracted from the second to calculate the image data that will be used to display the image.

Figure 6:
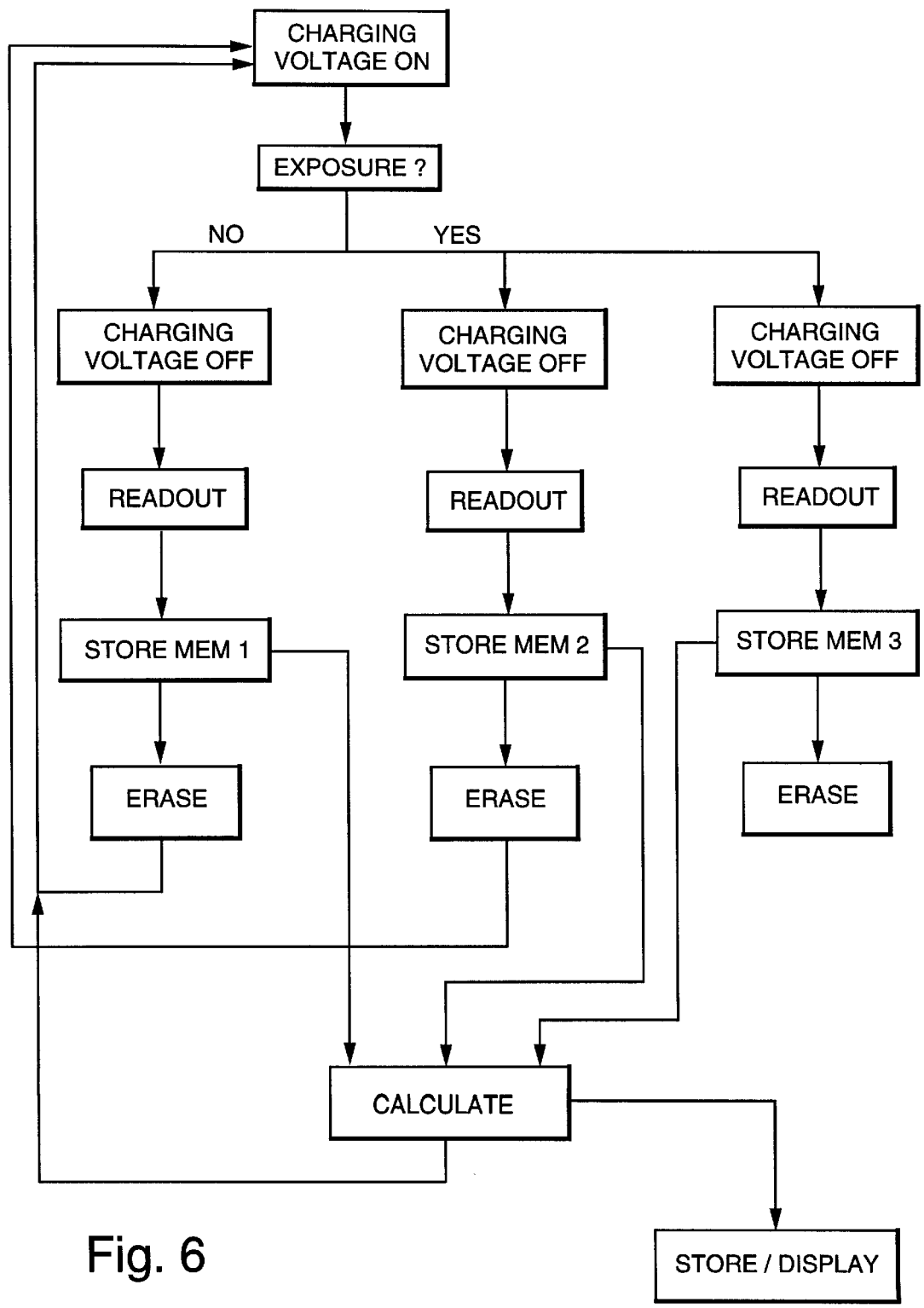
FIG. 6 shows a flow diagram of the data processing sequence for the data obtained through the use of the preferred embodiment of the process of the present invention.

FIG. 6 is a flow diagram of the preferred mode of operation. As shown, when there is no exposure the cycle repeats as described above. When an exposure occurs, the cycle does not repeat as before but follows the extreme right hand branch of the flow diagram, storing the readout data of the first post exposure cycle in memory number 3.

Once the data is stored, a corrected exposure value is calculated by using the stored values in all three memories and the original cycle resumes.

In yet another possible variation, the panel may be continuously cycled as described, but the read out data is not stored in the first memory until an exposure is about to take place. Only then is the pre-exposure data stored.

Figure 7:
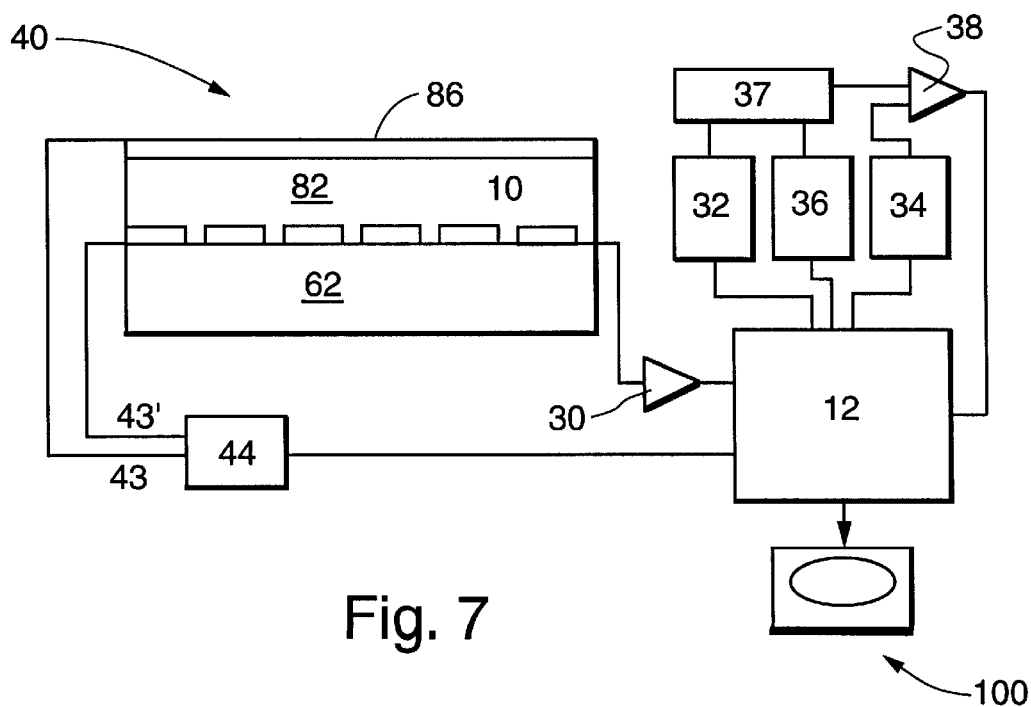
FIG. 7 shows in schematic illustration apparatus for implementing the method of the present invention.

FIG. 7 shows in schematic representation apparatus for performing the above functions. Such apparatus includes a panel 40 which may be of the type shown in detail in FIGS. 1 and 2, includes a top electrode 86 over a photoconductive radiation detection layer 82, and a plurality of radiation sensors 10 on a support 62.

Associated with panel 40 is a controller 12 which controls the operation of the panel and implements the flow diagram of FIGS. 5 and 6.

Among other functions, the controller 12 controls the panel cycling by initiating the application and removal of the charging voltage through a power supply 44 connected to the top electrode through line 43' and to the bottom microplates through line 43 which is preferably grounded. The controller initiates the readout sequence and directs the data output from data processing electronics 30 to the appropriate first, second or third memories (32,36 and 34 respectively). Memory 32 may be used to stored pre-exposure data, 34 to store exposure data and 36 to store post-exposure data.

The controller also initiates the operation of the calculation of the corrected pixel values by sending the proper pixel values from the three memories to calculating modules 37, where the average of the pre-exposure and post-exposure data is obtained, and 38 where the calculated average subtracted from the exposure data, pixel by pixel. The controller 12 includes, preferably, a timing means and a CPU, and is programmed to perform all the different functions required for the proper operation of the panel. Such technology is well known in the art.

Not shown is a means to indicate to the controller that an exposure is about to begin. This is preferably done automatically, by providing the controller with a communication link connected to the radiation equipment so that proper timing may be assured.

The data from the pixels may undergo other data processing to remove other defects not related to the ghost images discussed in this invention. For instance, as is well known in the art, panels of the size useful in medical radiographic applications comprise millions of pixels and, even with the best manufacturing technology available today, there are often dead pixels in a panel. Correction of such defects is often done by substitution of a value derived from adjacent pixels in any one of a number of ways known in the art. Such corrections may be made either before storing any pixel values in any of the three memories, or after deriving the corrected pixel values from the combination of the three memory stored values.

Those skilled in the art having the benefit of the teachings of the present invention as hereinabove set forth, can effect numerous modifications thereto. These modifications are to be construed as being encompassed within the scope of the present invention as set forth in the appended claims.

I claim:

1. A process for reducing prior exposure residual image artifacts in an electronic signal representing an image comprising a plurality of pixels, said image resulting from the exposure of a detector which comprises a photoconductor layer to imaging radiation, the process comprising in the following order:

I operating the detector without exposing said photoconductor layer to imaging radiation and obtaining a pre-exposure electronic signal from said plurality of pixels said signal containing prior exposure residual image artifacts;

II operating the detector a second time, exposing said photoconductor layer to imaging radiation and obtaining an exposure electronic signal from the plurality of pixels; and III subtracting the pre-exposure electronic signal from the exposure signal pixel by pixel to produce a corrected exposure electronic signal having reduced prior exposure image artifacts.

2. A process for removing residual prior image information from new image information generated by radiation exposure of an image detection array which contains a plurality of radiation sensitive picture elements (pixels) comprising a photoconductor layer, wherein said detectors store electrical charges when the photoconductor layer is exposed to incident radiation, the process comprising in the following order the steps of:

I) continuously operating the array between image exposures;

II) obtaining and storing for each pixel pre-exposure data representing a residual charge read out from the pixel prior to a new image exposure;

III) operating and exposing the photoconductor layer of the array to imaging radiation;

IV) obtaining and storing for each pixel exposure data read out from the detection panel, representing an image charge due to the image exposure;

V) for each pixel subtracting the pre-exposure data from the exposure data to obtain corrected exposure data; and VI) displaying said corrected exposure data.

3. A process for correcting residual artifacts in an electronic signal representing an image comprising a plurality of pixels, said image resulting from the exposure of a detector which comprises a photoconductor layer to imaging radiation, the process comprising:

I) operating the detector without exposing said photoconductor layer to imaging radiation and obtaining a pre-exposure electronic signal containing prior exposure residual image artifacts from said plurality of pixels;

II) operating the detector a second time, exposing said photoconductor layer to imaging radiation and obtaining an exposure electronic signal from the plurality of pixels;

III) operating the detector a third time, following exposure to imaging radiation, again without exposing the photoconductor to imaging radiation, to obtain a post-exposure electronic signal;

IV) averaging the pre-exposure and post-exposure signals for each pixel to obtain an average electronic signal; and V) subtracting said average signal from the exposure signal, pixel by pixel, to produce a corrected exposure electronic signal.

4. The process according to claim 3 wherein the electronic signal is a digital signal.

5. A process for removing residual prior image information from new image information generated by radiation exposure of an image detection array which contains a plurality of radiation sensitive picture elements (pixels) comprising a photoconductor layer, wherein said detectors store electrical charges when the photoconductor layer is exposed to incident radiation, the process comprising in the following order the steps of:

I) continuously operating the array between image exposures;

II) obtaining and storing for each pixel pre-exposure data representing a residual charge read out from the pixel prior to a new image exposure;

III) operating and exposing the photoconductor layer of the array to imaging radiation;

IV) obtaining and storing for each pixel exposure data read out from the detection panel, representing an image charge due to the image exposure;

VII) operating the array at least one more time without exposing to imaging radiation and obtaining and storing in said memory post-exposure data representing post-exposure charge read out from the detection panel for each pixel immediately following the new image exposure;

VIII) obtaining a correction signal for each pixel by averaging for each pixel the pre- and post-exposure data corresponding to each pixel;

IX) subtracting the correction data corresponding to each pixel from the exposure data to obtain a pixel by pixel corrected new image exposure data which is substantially free from residual image information.

6. The process according to claim 5 wherein the photoconductor in the photoconductor layer is amorphous selenium.

* * * * *